(12) United States Patent
Batchu et al.

(10) Patent No.: US 8,849,350 B1
(45) Date of Patent: Sep. 30, 2014

(54) QUAD SIM FUNCTIONALITY FOR A DUAL ACTIVE MOBILE DEVICE

(71) Applicant: QUALCOMM Incorporated, San Diego, CA (US)

(72) Inventors: Bhaskara Viswanadham Batchu, Medak (IN); Aditya Kailash Bohra, Gujarat (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/897,393

(22) Filed: May 18, 2013

(51) Int. Cl.
 *H04B 1/38* (2006.01)
 *H04W 88/06* (2009.01)
(52) U.S. Cl.
 CPC ............ *H04B 1/3816* (2013.01); *H04W 88/06* (2013.01)
 USPC ........................................................ 455/558
(58) Field of Classification Search
 USPC ........................................................ 455/558
 See application file for complete search history.

(56) References Cited

U.S. PATENT DOCUMENTS

| 2011/0217969 A1 | 9/2011 | Spartz et al. |
| 2012/0178402 A1 | 7/2012 | Krishnamoorthy et al. |
| 2012/0190362 A1 | 7/2012 | Subbarayudu et al. |

FOREIGN PATENT DOCUMENTS

| CN | 201699764 U | 1/2011 |
| CN | 201904834 U | 7/2011 |

*Primary Examiner* — Joel Ajayi
(74) *Attorney, Agent, or Firm* — The Marbury Law Group, PLLC

(57) ABSTRACT

Methods, systems and devices are providing for managing quad SIM functionality on a mobile device. The method includes maintaining active in a data traffic state on a first radio frequency (RF) chain of the mobile device a first subscription of a first SIM. Also, maintaining active in a slotted idle state each of a second SIM subscription, a third SIM subscription and a fourth SIM subscription on a second RF chain of the mobile device. The slotted idle states enabling the subscriptions to monitor pages in their paging channel slots. The method may include switching the third and fourth subscriptions to the first RF chain in response to the second subscription exiting the slotted idle state. The first, subscription may operate with tune away support while the third and fourth subscriptions operate in slotted idle state together on the first RF chain.

40 Claims, 9 Drawing Sheets

QUAD SIM FUNCTIONALITY FOR A DUAL ACTIVE MOBILE DEVICE

FIELD

The present application relates to managing functionality on a mobile communication device, and more particularly to handling quad SIM subscriptions of a dual active mobile communication device.

BACKGROUND

Mobile communication devices, such as cellular telephones, transmit and/or receive data using various protocols to communicate remotely. Other portable devices such as laptop computers, tablet computers, portable game consoles and even watches may also include components that receive and transmit data, which makes them further examples of communication devices that are mobile. Such mobile communication devices generally include a subscriber identity/identification module (SIM) card, which is an integrated circuit used to store codes that identify and authenticate subscribers across mobile communication networks.

A "subscription" may include services to which the subscriber by way of a mobile device has access. For example, a telephone number and the communications using that number are part of a subscription accessed using a SIM card. Subscriptions may use various communication standards, such as long term evolution (LTE), global system for mobile communications (GSM), general packet radio service (GPRS), enhanced data rates for GSM evolution (EDGE), universal mobile telecommunications system (UMTS), generic radio access network (GRAN), evolution-data optimized (1x/DO), and wideband code division multiple access (WCDMA) and code division multiple access (CDMA) to communicate across mobile communication networks.

Some mobile devices may include more than one SIM card in order to maintain more than one subscription. For example, dual SIM mobile devices include two SIM cards and quad SIM mobile devices include four SIM cards. In this way, a single mobile device may use different telephone numbers and maintain separate bills. Also, by using multiple SIM cards a user my keep business subscriptions separate from personal subscriptions, take advantage of different pricing/service plans or have an additional SIM card specific to a another country or region.

While having multiple SIM cards in one device has its advantages, dual SIM mobile devices consume more power than their single SIM counterparts, and quad SIM mobile devices tend to consume significantly more power than dual SIM mobile devices, which reduces their performance and is generally undesirable. Configuring dual SIM mobile devices to have two SIM cards that use a common radio frequency (RF) circuit (referred to as an "RF chain") to communicate reduces the number of transceivers to one, which may save power. Similarly, Quad-SIM mobile devices may have just two RF chains to support the four SIM cards (i.e., enable wireless communications via the subscriptions supported by each of the SIM cards). However, such configurations mean that when one of the subscriptions starts using an RF chain for a long duration, there is a high likelihood that another subscription on that same RF chain may enter an out-of-service state.

SUMMARY

The various embodiments include methods of managing quad SIM functionality on a mobile device. An embodiment method may include maintaining active in a data traffic state on a first radio frequency (RF) chain of the mobile device a first subscription. Also, maintaining active in a slotted idle state each of a second subscription, a third subscription and a fourth subscription on a second RF chain of the mobile device. The slotted idle states enabling the second subscription, the third subscription and the fourth subscription may be able to monitor pages in respective ones of paging channel slots. For purposes of nomenclature, the first subscription is associated with a first SIM and the second subscription is associated with a second SIM, the third subscription is associated with a third SIM, and the fourth subscription is associated with a fourth SIM. The method may include switching the third subscription and the fourth subscription to the first RF chain in response to the second subscription exiting the slotted idle state. Together on the first RF chain the first subscription may operate with tune away support while the third subscription and the fourth subscription operate in slotted idle state.

An embodiment method may include maintaining active in a first data traffic state on a first radio frequency (RF) chain of the mobile device a first subscription associated with a first SIM. The first data traffic state may operate with tune away support. Also, maintaining active in a second data traffic state on a second radio frequency (RF) chain of the mobile device a second subscription associated with a second SIM. The second data traffic state may also operate with tune away support. The method may also include maintaining active in a slotted idle state each of a third subscription associated with a third SIM and a fourth subscription associated with a fourth SIM on the second RF chain of the mobile device. In the slotted idle state the third subscription and the fourth subscription may be able to monitor pages in respective ones of paging channel slots. The third subscription and the fourth subscription may be switched to the first RF chain in response to a first throughput data rate of the first subscription being lower than a second throughput data rate of the second subscription.

Further embodiments may include a computing device having a processor configured with processor-executable software instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
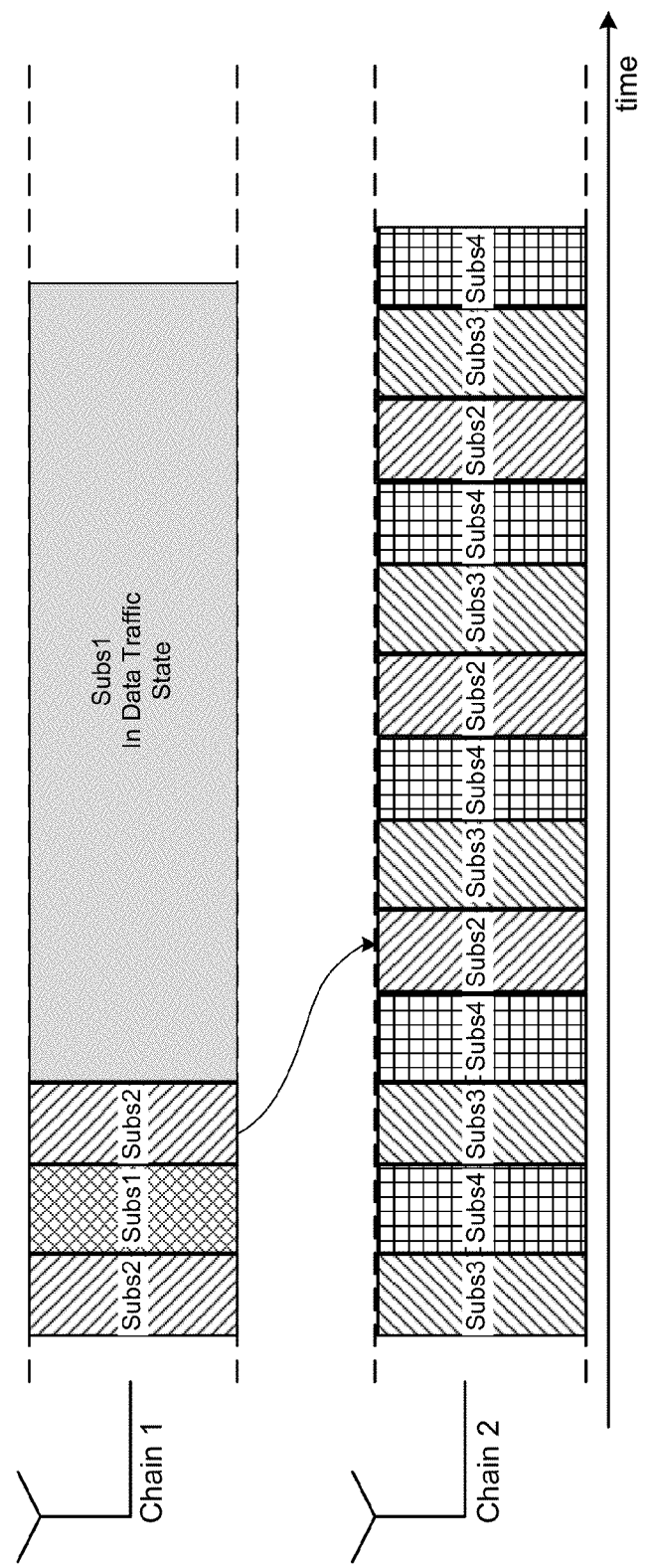
FIG. 1 is a sequence architecture diagram illustrating the operation of two RF chains, suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any implementation described herein as "exemplary" is not necessarily to be construed as preferred or advantageous over other implementations. Additionally, use of the words, "first," "second," "third," "primary," "secondary," "tertiary" or similar verbiage is intended herein for clarity purposes to distinguish various described elements and is not intended to limit the invention to a particular order or hierarchy of elements.

Also, as used herein the term "RF chain" refers to the sequence of circuit elements, including a transmitter and/or receiver (or a transceiver), along which a wireless signal may be transmitted and/or received. The RF chain may include transmitters, receivers, conductive elements, amplifiers, attenuators, measurements instruments, loads, wires, cables and more. Also, such circuit elements in an RF chain may be combined and share common circuitry or a single housing, such as in a single mobile communication modem chip or circuit board.

The terms "mobile communication device" and "mobile device" are used interchangeably herein to refer to any one or all of cellular telephones, smartphones, personal or mobile multi-media players, personal data assistants (PDA's), laptop computers, tablet computers, netbooks, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in data-only mobile devices, such as cell phones, tablets and laptops that have limited battery life, the embodiments are generally useful in any computing device that may be used to access wireless IP and data services through cellular communication networks.

The various embodiments manage hardware usage for efficient multi SIM (e.g., quad SIM) functionality in a mobile communication device, which may translate into improved mobile terminal traffic performance across multiple subscriptions. In an embodiment, a quad-SIM mobile device includes two RF chains supporting the four SIM cards. More than one subscription may operate at a time on one RF chain, such as two subscriptions in dual SIM dual standby (DSDS) mode. DSDS mode is a slotted idle state that allows each of the two subscriptions on that one RF chain to monitor pages in their respective paging channel slots. In a slotted idle state, multiple subscriptions may remain active on a single RF chain. Similarly, a mobile communication device with two RF chains may maintain four subscriptions active using this technique for four SIM cards; each chain maintaining multiple subscriptions active in an idle state monitor pages in their respective paging channel slots. When monitoring pages in a paging channel slot, the mobile communication device wakes-up from a sleep and actively reads page messages, if received from a base station. Also, the mobile communication device may reply by sending back a message, if appropriate. Such monitoring (including reading and replying) is generally referred to as a slotted idle state. In a slotted idle state, the device wakes up, checks whether a page is received and goes back to sleep if there is no page received. In an active slotted idle state, the device will regularly wake up from a temporary sleep to monitor the page and return to sleep, which process is then repeated after another period of sleep. In contrast, in a non-slotted state, the device does not go to sleep and monitors for pages continuously.

Additionally, the various embodiments may take advantage of the "tune away" functionality, which refers to the process by which an RF chain tunes to a first frequency to support an ongoing communication session, but may briefly tune to a second frequency to accept page communications before tuning back to the first frequency.

FIG. 1 illustrates a sequence architecture diagram of two RF chains of a quad SIM mobile communication device. The RF chains may each carry more than one subscription across a period of time. The sequence architecture follows a time line heading from left to right, in the orientation shown. One RF chain, indicated as RF chain 1, initially carries Subscription 1 (Subs1) and Subscription 2 (Subs2) in slotted idle states. In this way, Subs1 and Subs2 on RF chain 1 alternate in reading pages of their respective subscriptions. Subs1 is associated with a first SIM and Subs2 is associated with a second SIM. Similarly the other RF chain, indicated as RF chain 2, carries Subscription 3 (Subs3) and Subscription 4 (Subs4) in slotted idle states. Subs3 is associated with a third SIM and Subs4 is associated with a fourth SIM. In each slotted idle state, the subscriptions are able to monitor pages in their respective paging channel slots. RF chain 1 and RF chain 2 may achieve this configuration by supporting a dual standby dual SIM mode of operation.

In an embodiment, two or three of the four subscriptions, all in a slotted idle state, may use a single one of the RF chains to monitor pages in their respective paging channel slots. This leaves the other RF chain for maintaining the remaining subscription(s). As illustrated in FIG. 1, as time progresses and Subs1 becomes active in a data traffic state, Subs2 may be switched from RF chain 1 to RF chain 2. Subs3 and Subs4 may remain active on RF chain 2 with Subs 2 having the three subscriptions using slotted idle states. In the slotted idle state Subs2, Subs 3 and Subs4 are able to monitor pages in respective ones of their paging channel slots. Meanwhile, Subs1 may be maintained by itself active in a data traffic state on RF chain 1.

Figure 2:
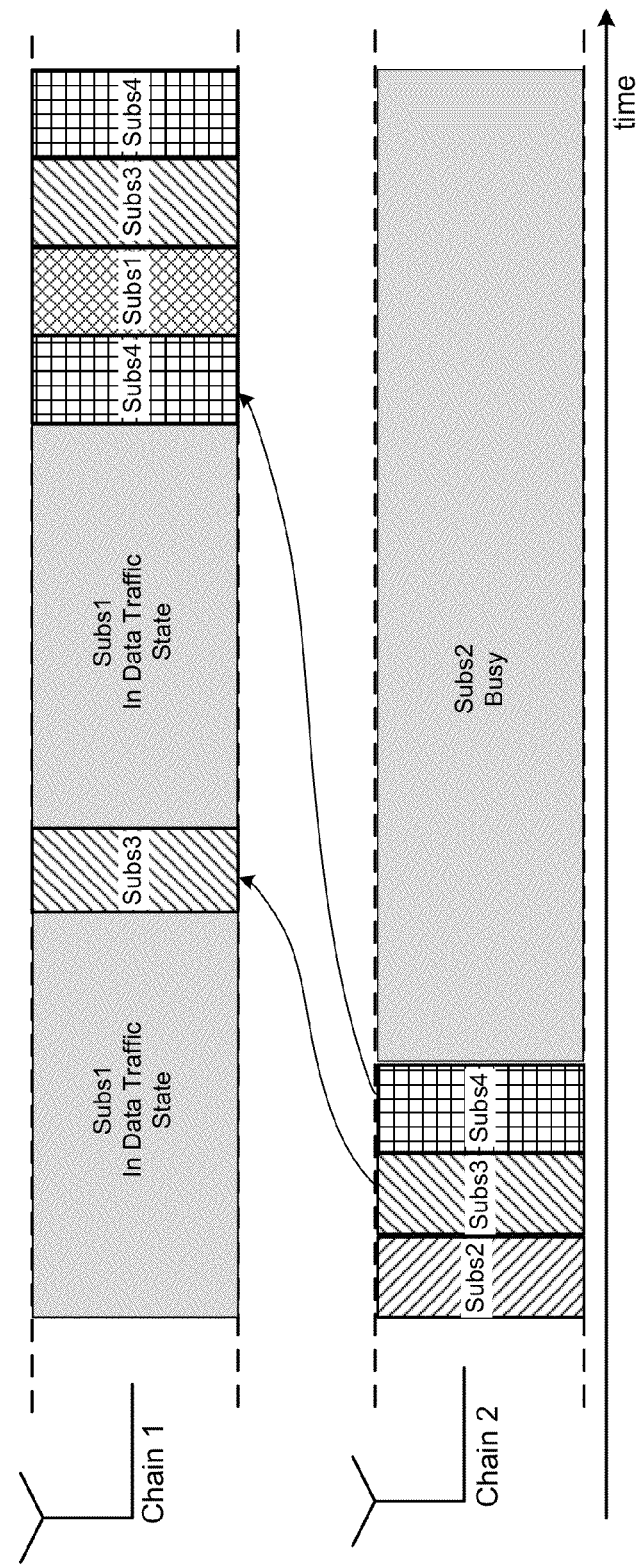
FIG. 2 is another sequence architecture diagram illustrating the operation of two RF chains with a subscription exiting a slotted idle state and two other subscriptions moved from one RF chain to another, suitable for use in the various embodiments.

In accordance with an embodiment, FIG. 2 illustrates another sequence architecture diagram of two RF chains. The initial part of the timeline in FIG. 2 picks-up with the distribution of subscriptions, Subs1, Subs2, Subs3 and Subs4 similar to that shown at the end of the timeline in FIG. 1. Namely, Subs 1 (associated with a first SIM) is maintained active in a data traffic state on RF chain 1, where the data traffic state operates with tune away support. Also, Subs 2, Subs 3 and Subs4 (associated with second, third and fourth SIMs, respectively) are each maintaining active in a slotted idle state on RF chain 2. As time progresses one of the three subscriptions carried on RF chain 2, Subs2, exits the slotted idle state and enters a state likely to occupy the chain for a long duration without the ability to tune away, which is shown as "Busy" in FIG. 2. Examples of the busy state include conditions that occupy a chain for long duration without tune away support, such as an out-of-service state, an access state, and a voice traffic state. In an out-of-service state, the subscription may keep the RF chain occupied for a long time. Also, a subscription entering an access state, which subscriptions may enter for registrations, where the RF conditions are poor may experience a long duration occupancy on the RF chain and is thus considered a busy state. Similarly, a voice traffic state may be one that is considered a busy state. Further, where a subscription enters a continuous data traffic state without tune away support that subscription may also be considered to be in a busy state. Having one of the three subscriptions in a busy state will likely cause one or both of the other two subscriptions to go into an out-of-service state. Thus, considering Subs1 is in a data traffic state with tune away support, Subs3 and Subs4 may be switched to RF chain 1 in response to Subs2 exiting the slotted idle state. In this way, on RF chain 1 Subs3 and Subs4 are maintained in a slotted idle state and Subs1 is maintained active in a data traffic state with tune away support. This may prevent system loss of Subs3 and Subs4, which might otherwise go into an out-of-service state.

Another aspect that may be applied to the various embodiments is shown in FIG. 2, toward the end of the timeline. In particular, after RF chain 1 is carrying Subs1 in a data traffic state with tune away support, as well as Subs3 and Subs4 is slotted idle states, Subs1 then also enters a slotted idle state. This results in a similar configuration to that shown at the end of the timeline in FIG. 1, with three subscriptions in the slotted idle state on one chain and the fourth subscription carried alone on the other chain.

Figure 3:
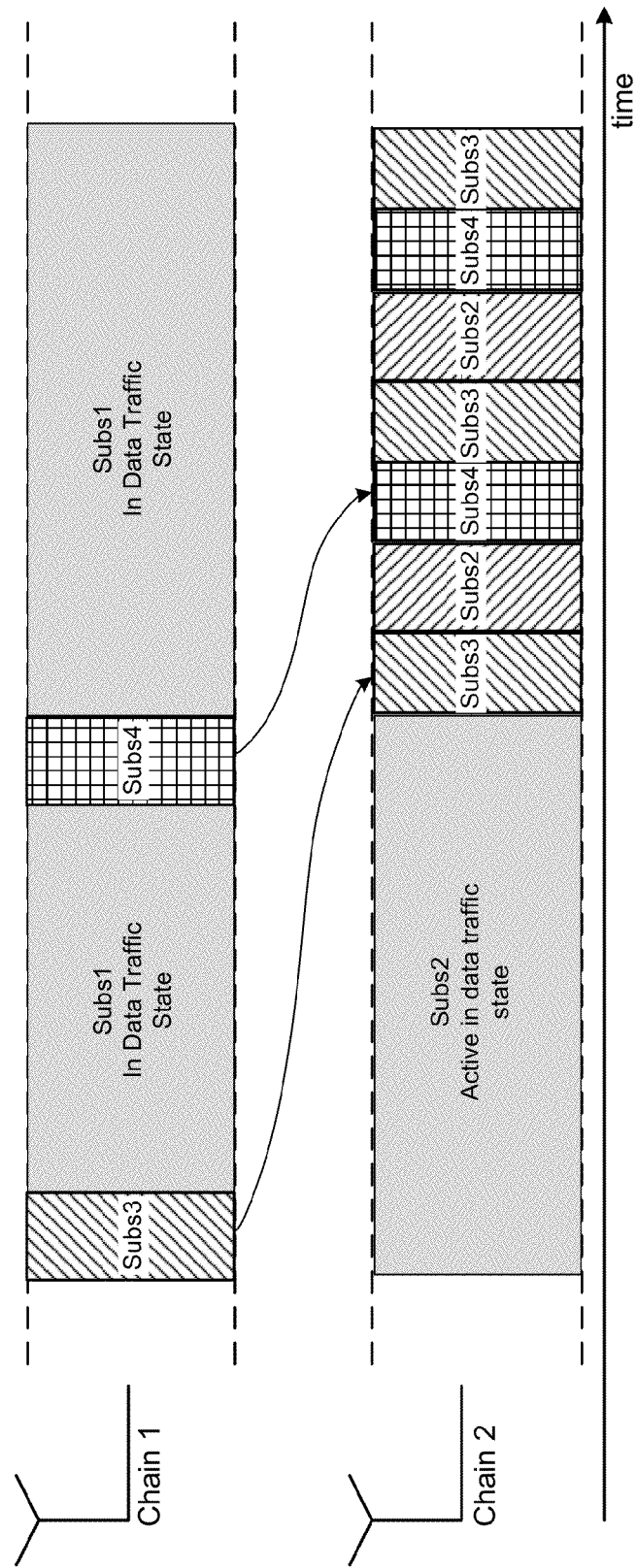
FIG. 3 is a further sequence architecture diagram illustrating the operation of two RF chains with a subscription exiting a data traffic state and two other subscriptions moved from one RF chain to another, suitable for use in the various embodiments.

FIG. 3 illustrates a further sequence architecture diagram of two RF chains applicable to the various embodiments. Initially along the timeline, RF chain 1 carries Subs1 in a data traffic state, with tune away support, and Subs3 and Subs4 in slotted idle states. As shown, the subscriptions are maintained such that initially Subs3 may perform page demodulation for a brief period, followed by Subs1 actively carrying data traffic for a longer period. This sequence may be followed by Subs4 performing its page demodulation for a brief period, similarly followed by Subs1 actively carrying data traffic for a longer period. In this way, the page slots for the idle state subscriptions alternate following the active data traffic state subscription. A similar sequence is shown in FIG. 2. Alternatively, both Subs3 and Subs4 may consecutively perform page demodulation, with Subs 1 carrying data traffic before and/or after both the two slotted idle subscriptions. After the initial part of the timeline in FIG. 3, Subs2 carried on RF chain 2 is shown re-entering the slotted idle state and thus exiting the data traffic state. Accordingly, one of the subscriptions on RF chain 1 may be switched to RF chain 2. In this circumstance, as Subs 1 is still in data traffic state, both Subs 3 and Subs4 may be switched to RF chain 2. Then RF chain 2 carries three subscriptions in slotted idle state and RF chain 1 carries the one other subscription, which happens to be in data traffic state.

Figure 4:
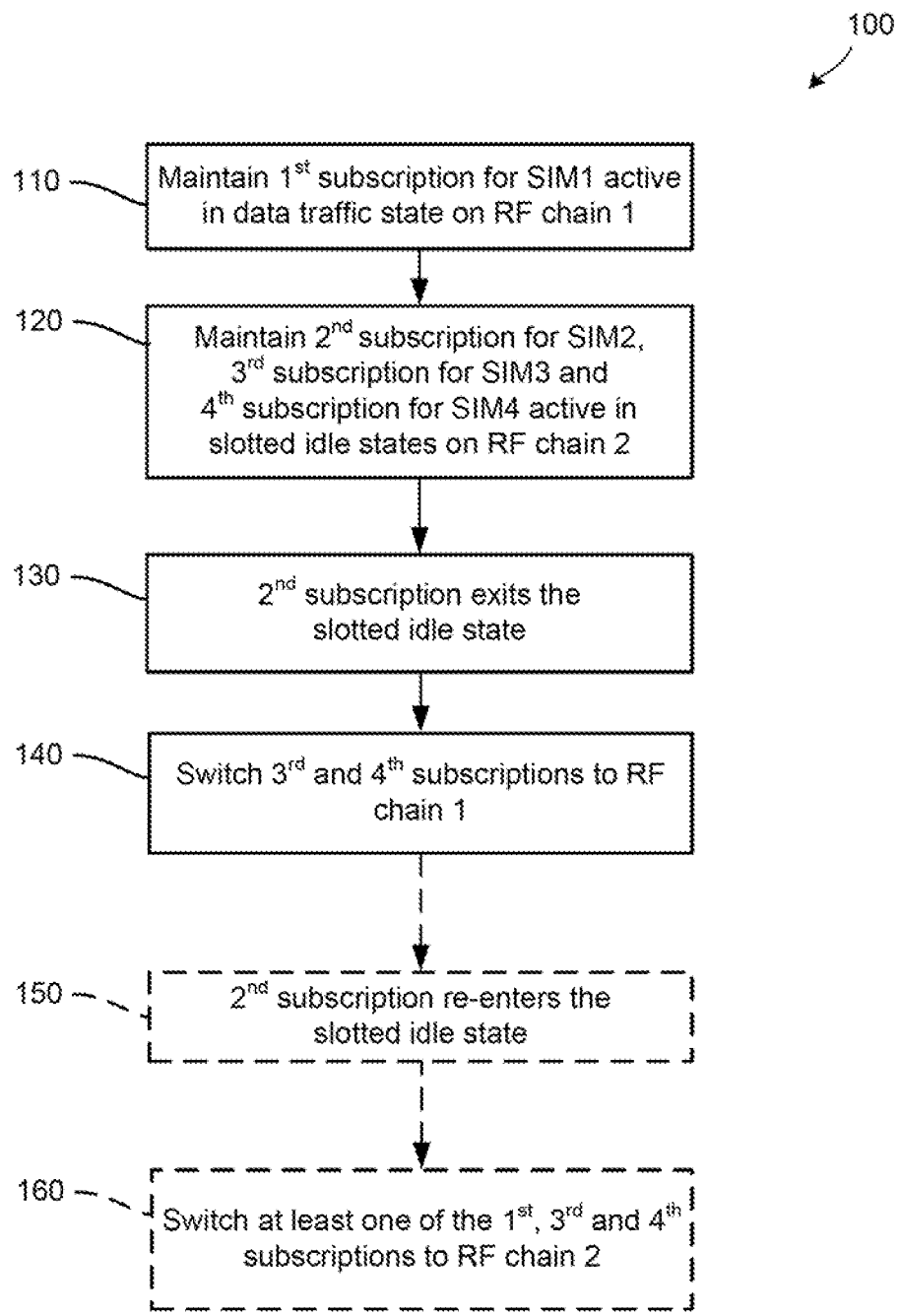
FIG. 4 is a process flow diagram illustrating an embodiment method of managing quad SIM functionality on a mobile device in accordance with an embodiment.

FIG. 4 illustrates an embodiment method 100 of managing quad SIM functionality on a mobile device. In block 110 a first subscription associated with a first SIM is maintained active in a data traffic state on RF chain 1 of a quad SIM mobile device. The first subscription may initially operate with tune away support. In block 120 a second, third and fourth subscription, each respectively associated with a separate SIM, are maintained in slotted idle states on RF chain 2 of the quad SIM mobile device. In the slotted idle state, the second, third and fourth subscriptions are each able to monitor pages in respective ones of their paging channel slots. In block 130 the second subscription exits the slotted idle state and enters a busy state. For example, the second subscription may enter out-of-service state, access state, voice traffic state or a data traffic state without tune away support. In block 140 the third subscription and the fourth subscription are switched to the first RF chain already carrying the first subscription. This may be achieved by maintaining or placing the first subscription into a state that supports it being able to frequently tune away, such as a data traffic state with tune away support. If Subs1 was already in a data traffic state with tune away support, it may be maintained that way. Also, the third and fourth subscriptions are carried on RF chain 1 in slotted idle states, as described in further detail above. Block 150 is shown as an alternative part of the method, should the second subscription re-enter the slotted idle state. If so, in block 160 at least one of the subscriptions on the other RF chain may be switched to that one RF chain. For example, this may be just one other subscription in slotted idle state or even two other subscriptions in slotted idle state.

In the various embodiments, the overhead costs associated with a quad SIM mobile device may be reduced, particularly if that device excessively switches subscriptions between RF chains. This type of switching may account for some unnecessary power consumption. Thus, limits may be placed on the frequency or the number of times such switching may occur. In this way, the interests of keeping subscriptions out of the out-of-service state are balanced against excess power consumption.

Figure 5:
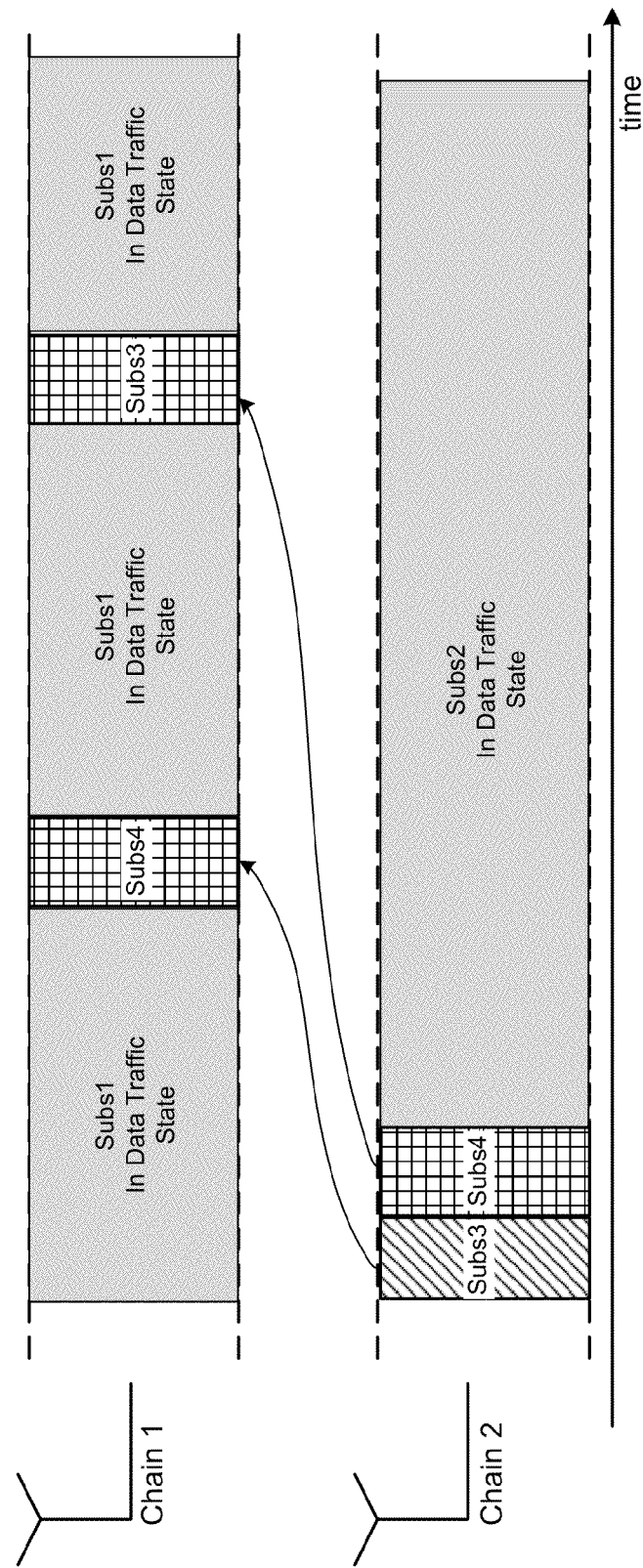
FIG. 5 is a sequence architecture diagram illustrating two subscriptions moved from one RF chain in response to an a throughput data rate determination, suitable for use in the various embodiments.

FIG. 5 illustrates another sequence architecture diagram of two RF chains in accordance with an embodiment. Initially along the timeline subscriptions, Subs2, Subs3 and Subs4 are all carried on the RF chain 2, while RF chain 1 carries Subs1 in a data traffic state with tune away support. Throughout the various embodiments herein, each of the subscriptions may be associated with its own separate SIM card. As time progresses one of the three subscriptions carried on RF chain 2, namely Subs2, enters a data traffic state with tune away support. Thus, both RF chain 1 and RF chain 2 each carry one subscription in a data traffic state with tune away support. Accordingly, a determination may be made as to which of the two subscriptions in the data traffic state have a higher throughput data rate. Keeping the data connection which is running at a higher throughput data rate intact may provide a better user experience for the mobile device. Thus, the RF chain having the lower throughput data rate may be better suited for carrying the two slotted idle state subscriptions, while also potentially preventing them from losing service. FIG. 5 illustrates a circumstance where RF chain 1, carrying Subs1 in a data traffic state, has a lower throughput data rate than RF chain 2, carrying Subs2 in a data traffic state. Therefore, Subs3 and Subs4 may be switched from RF chain 2 to RF chain 1. Alternatively, if RF chain 2 had a lower throughput data rate than RF chain 1, then Subs3 and Subs4 may remain on RF chain 2.

When the two RF chains each carry one subscription in data traffic state, a throughput data rate determination may be made. Such a determination may be made when the second of the two subscriptions first enters the data traffic state or at some later point, such as after one or more cycles of the RF chain initially carrying the data traffic state subscription tuning away for the page demodulation of the slotted idle state subscriptions. Also, the throughput data rate of each RF chain may be periodically checked, in case there is a change.

Figure 6:
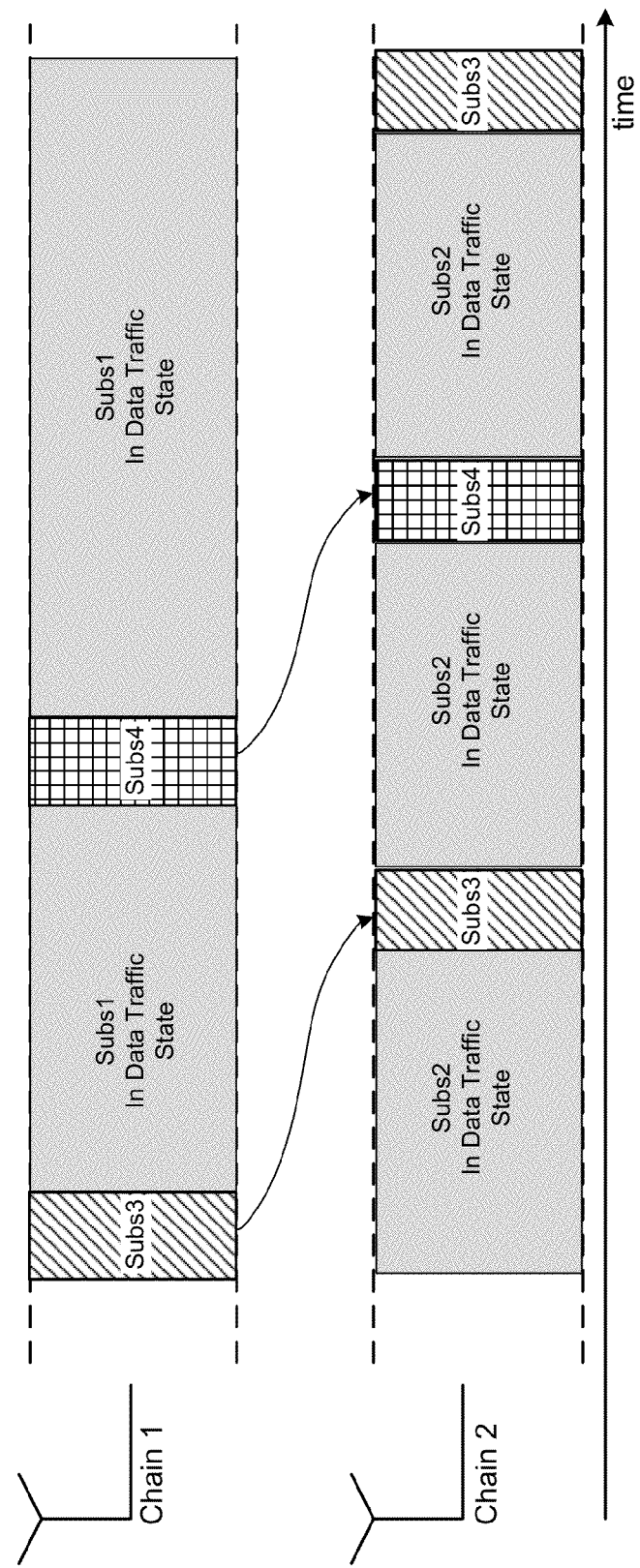
FIG. 6 is yet another sequence architecture diagram illustrating two subscriptions moved from one RF chain in response to a further throughput data rate determination, suitable for use in the various embodiments.

FIG. 6 is yet another sequence architecture diagram illustrating subscriptions moved from one RF chain to another in response to a throughput data rate change, suitable for use in the various embodiments. Initially, RF chain 1 carries Subs 1 in a data traffic state with tune away support, as well as Subs3 and Subs 4 both in slotted idle states. Meanwhile, RF chain 2 carries Subs 2 in a data traffic state with tune away support. The throughput data rate for RF chain 1 may have been lower than that of RF chain 2, thus Subs 3 and Subs4 were switched to or maintained on RF chain 1. However, with a determination made that the throughput data rate of RF chain 2 is currently lower than that of RF chain 1, the slotted idle state subscriptions may get switched. Thus, in response to a throughput data rate change that shows RF chain 1 with the higher rate, Subs3 and Subs4 may be moved to RF chain 2.

Figure 7:
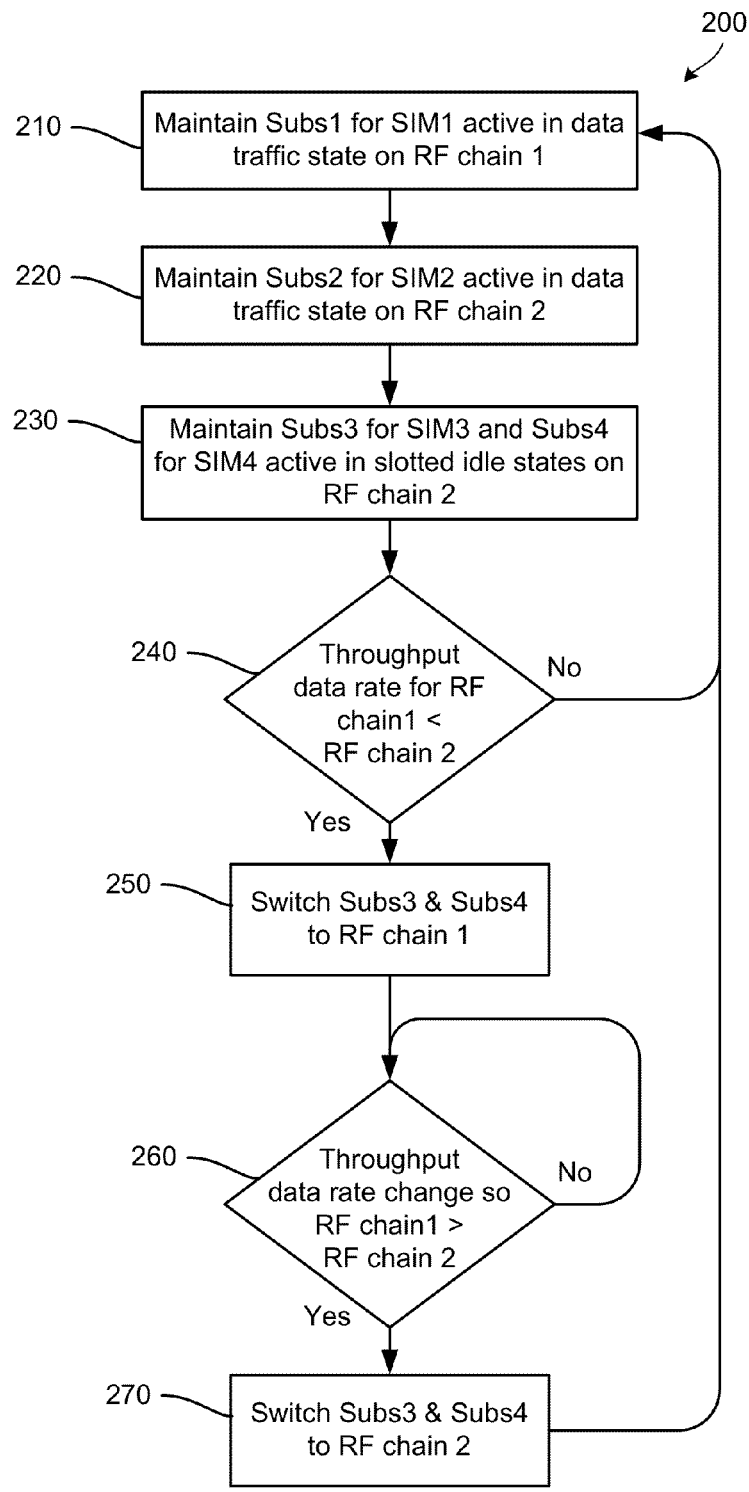
FIG. 7 is a process flow diagram illustrating an embodiment method of managing quad SIM functionality on a mobile device in accordance with an embodiment.

FIG. 7 illustrates an embodiment method 200 of managing quad SIM functionality on a mobile device. In block 210, a first subscription (Subs1) is maintaining active in a data traffic state on a first RF chain (RF chain 1) of a mobile device. Subs1 may be associated with a first SIM (SIM1). Also, the first data traffic state may operate with tune away support. In block 220, a second subscription (Subs2) is maintaining active in a data traffic state on a second RF chain (RF chain 2) of a mobile device. The second data traffic state may likewise operate with tune away support. Additionally, Subs2 may be associated with a second SIM (SIM2). In block 230, a third subscription (Subs3) and a fourth subscription (Subs4) may be maintained active in a slotted idle state on the second RF chain of the mobile device. Each of Subs3 and Subs4 may be associated with respective third and fourth SIMs. In the slotted idle state, Subs3 and Subs4 are able to monitor pages in respective ones of paging channel slots. In determination block 240, a determination may be made as to which RF chain is operating with the higher or lower throughput data rate. This may be an initial determination, where the throughput data rates were not previously determined, or an additional determination as to one or both of the RF chains for which throughput data rate information was previously determined. When the throughput data rate is determined to be higher on RF chain 1 (i.e., determination block 240="no"), the process may return to block 210. If the throughput data rate is determined to be lower on RF chain 1 (i.e., determination block 240="yes"), Subs3 and Subs4 may be switched to RF chain 1 in block 250. In this way, Subs3 and Subs4 may be maintained active on the first RF chain in a slotted idle state, while Subs 1 is maintained active in the data traffic state with tune away support. In determination block 260, a further determination may be made as to which RF chain is operating with the higher or lower throughput data rate. This operation may determine whether there has been a change in the throughput data rates and if so do conditions warrant switching the idle slotted state subscriptions to the other RF chain. When the throughput data rate is determined to be higher on RF chain 1 (i.e., determination block 260="no"), the process may repeat this determination after some period, to see whether a change has subsequently occurred. On the other hand, if the throughput data rate is determined to be higher on RF chain 1 as compared to RF chain 2 (i.e., determination block 260="yes"), Subs3 and Subs4 may be switched to RF chain 1 in block 270. Thereafter, the process may return to block 210.

Figure 8:
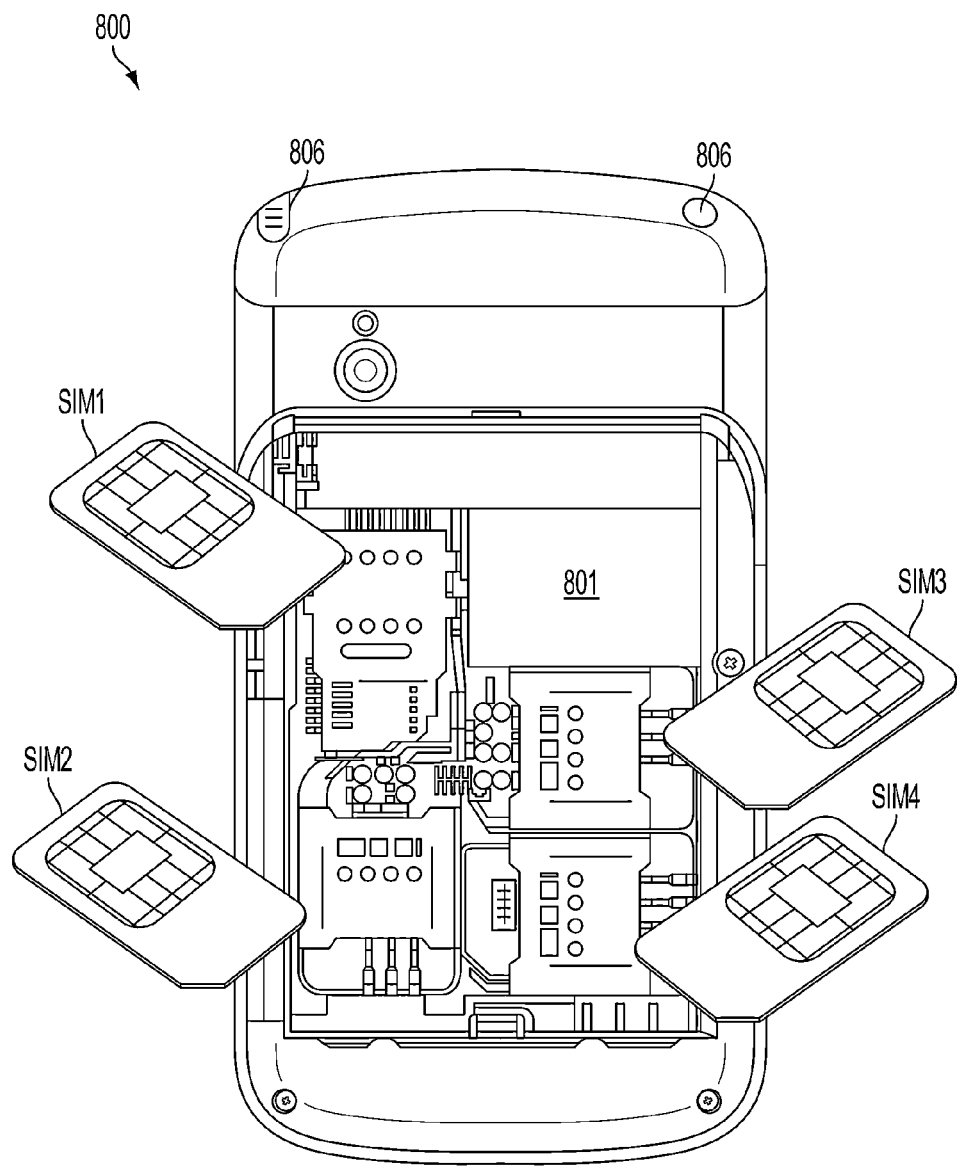
FIG. 8 is an illustration of a quad SIM mobile device in the form of a cellular telephone suitable for implementing the various embodiments.

The various embodiments may be implemented in and/or with any of a variety of computing devices, such as a mobile telephone, a further example of which is illustrated in FIG. 8 in the form of a cellular telephone with a back panel removed. Typical mobile communication devices will have in common the components illustrated in FIG. 8. For example, mobile communication devices 800 may include a processor 801 coupled to an internal memory and a touch surface input device/display (one reverse side), such as a resistive sensing touch-screen, capacitive sensing touch-screen, infrared sensing touch-screen, acoustic/piezoelectric sensing touch-screen, or the like. The mobile communication device 800 may have two radios/antennas 806 for sending and receiving data that are connected to wireless data links and/or cellular telephone transceivers coupled to the processor 801. Mobile communication devices 800 may also include a GPS receiver coupled to the processor 801 for determining locations of the device. Additionally, the illustrated mobile communication device 800 is a quad SIM device that includes four SIM cards, SIM1, SIM2, SIM3 and SIM4. These SIM cards are also coupled to the processor 801 for operatively switching SIM cards for use on either one of the radios/antennas 806, as described further above. Alternatively, the SIMs need not be four separate and distinct physical cards, but may be defined by software code within the mobile communication device 800, whether physically removable or otherwise reprogrammable.

Figure 9:
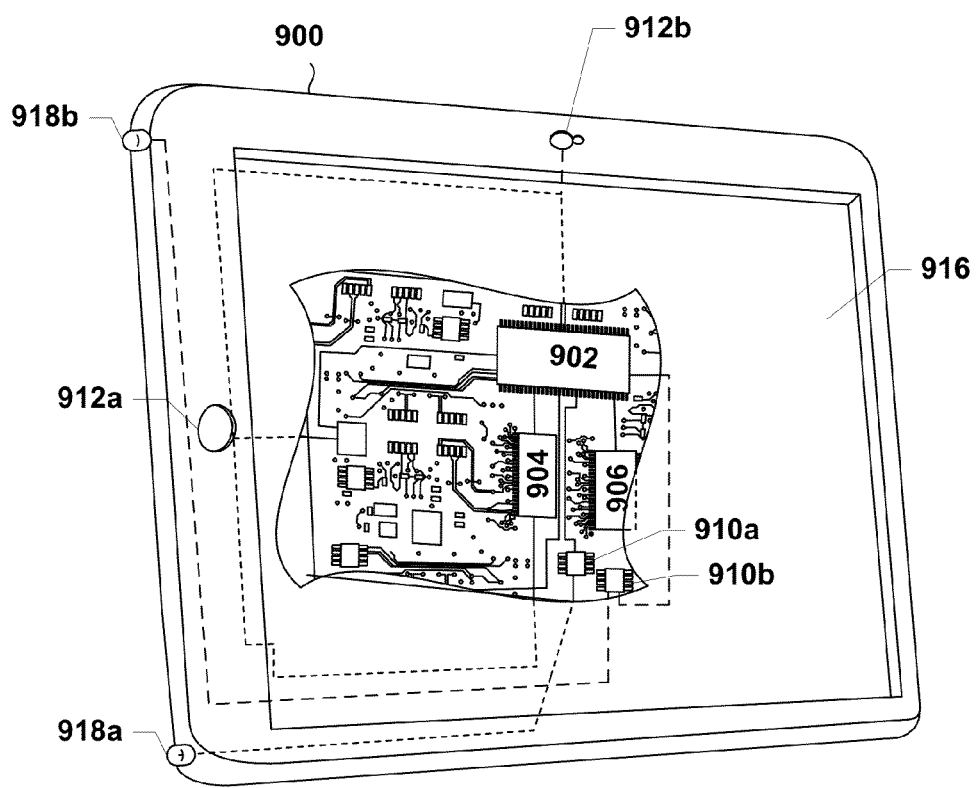
FIG. 9 is an illustration of a quad SIM mobile device in the form of a tablet computer suitable for implementing the various embodiments.

The various embodiments may be implemented in and/or with any of a variety of computing devices, such as a tablet computer, an example of which is illustrated in FIG. 9. For example, the mobile communication device 900 may include a processor 902 coupled to internal memories 904 and 906. Internal memories 904 and 906 may be volatile or non-volatile memories, and may also be secure and/or encrypted memories, or unsecure and/or unencrypted memories, or any combination thereof. The processor 902 may also be coupled to a user interface, such as a touch screen display 916 (e.g., a resistive-sensing touch screen, capacitive-sensing touch screen infrared sensing touch screen, or the like), or conventional buttons (e.g., 912a and 912b) and a non-touch screen display. Additionally, the mobile communication device 900 may include multiple network transceivers configured to enable the processor 902 to communicate with other computing devices over one or more wired or wireless networks, in accordance with the disclose embodiments. As a particular example, the network transceivers 910a, 910b of a mobile communication device 900 may include two antenna 918a, 918b for sending and receiving electromagnetic radiation that may be connected to one or more wireless data link transceivers and/or network transceivers 910a, 910b coupled to the processor 902. The mobile communication device 900 may also include physical buttons 912a and 912b for receiving user inputs. Embedded within the device are the quad SIM devices, which are in-turn operatively coupled to the processor 902.

The various embodiments may also be implemented in and/or with any of a variety of commercially available electronic devices. Such a laptop computer, which typically includes a processor coupled to volatile memory and a large capacity nonvolatile memory, such as a disk drive. The computer may also include a floppy disc drive, compact disc (CD) or DVD disc drive coupled to the processor. The computer may also include network access ports and antennas coupled to the processor for establishing network interface connections with a network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors in the various embodiments described herein may be any programmable microprocessor, microcomputer or multiple processor chip or chips that can be configured by software instructions (applications/programs) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the processor-executable software instructions. In many devices the internal memory may be a volatile or nonvolatile memory, such as flash memory, or a mixture of both. For the purposes of this description, a general reference to memory refers to memory accessible by the processors including internal memory or removable memory plugged into the device and memory within the processor themselves.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. The word "exemplary" is used herein to mean "serving as an example, instance, or illustration." Any implementation described herein as "exemplary" is not necessarily to be construed as preferred or advantageous over other implementations.

The various illustrative logical blocks, modules, circuits, and process flow diagram blocks described in connection with the embodiments may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing multi SIM functionality on a mobile device, comprising:

maintaining active in a data traffic state on a first radio frequency (RF) chain of the mobile device a first subscription associated with a first subscriber identity/identification module (SIM);

maintaining active in a slotted idle state each of a second subscription associated with a second SIM, a third subscription associated with a third SIM and a fourth subscription associated with a fourth SIM on a second RF chain of the mobile device, wherein in the slotted idle state the second subscription, the third subscription and the fourth subscription are able to monitor pages in respective ones of paging channel slots; and switching the third subscription and the fourth subscription to the first RF chain in response to the second subscription exiting the slotted idle state, wherein on the first RF chain the third subscription and the fourth subscription operate in the slotted idle state and the first subscription operates in the data traffic state with tune away support.

2. The method of claim 1, wherein the second subscription exiting the slotted idle state includes the second subscription entering one of an out-of-service state, an access state, a voice traffic state or a continuous data traffic state without tune away support.

3. The method of claim 1, further comprising:
maintaining active in the slotted idle state each of the first subscription, the third subscription and the fourth subscription on the first RF chain in response to the first subscription entering the slotted idle state.

4. The method of claim 1, further comprising maintaining the first subscription active in the data traffic state with tune away support in response to the third subscription and the fourth subscription being switched to the first RF chain.

5. The method of claim 1, further comprising:
switching at least one of the first subscription, the third subscription and the fourth subscription to the second RF chain from the first RF chain in response to the second subscription returning to the slotted idle state.

6. A mobile device, comprising:
a first radio frequency (RF) chain;
a second RF chain; and
a processor coupled to the first and second RF chain and a first, second, third and fourth subscriber identity/identification module (SIM), wherein the processor is configured with processor-executable instructions to perform operations comprising:
maintaining active in a data traffic state on the first RF chain a first subscription associated with the first SIM;
maintaining active in a slotted idle state each of a second subscription associated with the second SIM, a third subscription associated with the third SIM and a fourth subscription associated with the fourth SIM on the second RF chain, wherein in the slotted idle state the second subscription, the third subscription and the fourth subscription are able to monitor pages in respective ones of paging channel slots; and
switching the third subscription and the fourth subscription to the first RF chain in response to the second subscription exiting the slotted idle state, wherein on the first RF chain the third subscription and the fourth subscription operate in the slotted idle state and the first subscription operates in the data traffic state with tune away support.

7. The mobile device of claim 6, wherein the processor is configured with processor-executable instructions to perform operations such that the second subscription exiting the slotted idle state includes the second subscription entering one of an out-of-service state, an access state, a voice traffic state or a continuous data traffic state without tune away support.

8. The mobile device of claim 6, wherein the processor is configured with processor-executable instructions to perform operations further comprising:
maintaining active in the slotted idle state each of the first subscription, the third subscription and the fourth subscription on the first RF chain in response to the first subscription entering the slotted idle state.

9. The mobile device of claim 6, wherein the processor is configured with processor-executable instructions to perform operations further comprising maintaining the first subscription active in the data traffic state with tune away support in response to the third subscription and the fourth subscription being switched to the first RF chain.

10. The mobile device of claim 6, wherein the processor is configured with processor-executable instructions to perform operations further comprising:
switching at least one of the first subscription, the third subscription and the fourth subscription to the second RF chain from the first RF chain in response to the second subscription returning to the slotted idle state.

11. A mobile device, comprising:
a first radio frequency (RF) chain;
a second RF chain;
means for maintaining active in a data traffic state on the first RF chain a first subscription associated with a first subscriber identity/identification module (SIM);
means for maintaining active in a slotted idle state each of a second subscription associated with a second SIM, a third subscription associated with a third SIM and a fourth subscription associated with a fourth SIM on the second RF chain, wherein in the slotted idle state the second subscription, the third subscription and the fourth subscription are able to monitor pages in respective ones of paging channel slots; and
means for switching the third subscription and the fourth subscription to the first RF chain in response to the second subscription exiting the slotted idle state, wherein on the first RF chain the third subscription and the fourth subscription operate in the slotted idle state and the first subscription operates in the data traffic state with tune away support.

12. The mobile device of claim 11, wherein the second subscription exiting the slotted idle state includes the second subscription entering one of an out-of-service state, an access state, a voice traffic state or a continuous data traffic state without tune away support.

13. The mobile device of claim 11, further comprising:
means for maintaining active in the slotted idle state each of the first subscription, the third subscription and the fourth subscription on the first RF chain in response to the first subscription entering the slotted idle state.

14. The mobile device of claim 11, further comprising means for maintaining the first subscription active in the data traffic state with tune away support in response to the third subscription and the fourth subscription being switched to the first RF chain.

15. The mobile device of claim 11, further comprising:
means for switching at least one of the first subscription, the third subscription and the fourth subscription to the second RF chain from the first RF chain in response to the second subscription returning to the slotted idle state.

16. A non-transitory processor-readable medium having stored thereon processor-executable instructions configured to cause a processor of a mobile device to perform operations comprising:
maintaining active in a data traffic state on a first radio frequency (RF) chain of the mobile device a first subscription associated with a first subscriber identity/identification module (SIM);
maintaining active in a slotted idle state each of a second subscription associated with a second SIM, a third subscription associated with a third SIM and a fourth subscription associated with a fourth SIM on a second RF chain of the mobile device, wherein in the slotted idle state the second subscription, the third subscription and the fourth subscription are able to monitor pages in respective ones of paging channel slots; and switching the third subscription and the fourth subscription to the first RF chain in response to the second subscription exiting the slotted idle state, wherein on the first RF chain the third subscription and the fourth subscription operate in the slotted idle state and the first subscription operates in the data traffic state with tune away support.

17. The non-transitory processor-readable medium of claim 16, wherein the second subscription exiting the slotted idle state includes the second subscription entering one of an out-of-service state, an access state, a voice traffic state or a continuous data traffic state without tune away support.

18. The non-transitory processor-readable medium of claim 16, wherein the stored processor-executable instructions are configured to cause the processor of the mobile device to perform operations further comprising:
maintaining active in the slotted idle state each of the first subscription, the third subscription and the fourth subscription on the first RF chain in response to the first subscription entering the slotted idle state.

19. The non-transitory processor-readable medium of claim 16, wherein the stored processor-executable instructions are configured to cause the processor of the mobile device to perform operations further comprising maintaining the first subscription active in the data traffic state with tune away support in response to the third subscription and the fourth subscription being switched to the first RF chain.

20. The non-transitory processor-readable medium of claim 16, wherein the stored processor-executable instructions are configured to cause the processor of the mobile device to perform operations further comprising:
switching at least one of the first subscription, the third subscription and the fourth subscription to the second RF chain from the first RF chain in response to the second subscription returning to the slotted idle state.

21. A method of managing multi SIM functionality on a mobile device, the method comprising:
maintaining active in a first data traffic state on a first radio frequency (RF) chain of the mobile device a first subscription associated with a first subscriber identity/identification module (SIM), wherein the first data traffic state operates with tune away support;
maintaining active in a second data traffic state on a second RF chain of the mobile device a second subscription associated with a second SIM, wherein the second data traffic state operates with tune away support;
maintaining active in a slotted idle state each of a third subscription associated with a third SIM and a fourth subscription associated with a fourth SIM on the second RF chain of the mobile device, wherein in the slotted idle state the third subscription and the fourth subscription are able to monitor pages in respective ones of paging channel slots; and
switching the third subscription and the fourth subscription to the first RF chain in response to a first throughput data rate of the first subscription being lower than a second throughput data rate of the second subscription.

22. The method of claim 21, further comprising:
maintaining active on the first RF chain the third subscription and the fourth subscription in the slotted idle state and the first subscription in the first data traffic state with tune away support.

23. The method of claim 21, further comprising:
determining at least one of the first throughput data rate and the second throughput data rate.

24. The method of claim 21, further comprising:
switching at least one of the third subscription and the fourth subscription to the second RF chain in response to the second subscription exiting the second data traffic state.

25. The method of claim 21, further comprising:
switching the third subscription and the fourth subscription to the second RF chain in response to at least one of the first throughput data rate and the second throughput data rate changing, whereby the first throughput data rate exceeds the second throughput data rate.

26. A mobile device, comprising:
a first radio frequency (RF) chain;
a second RF chain; and
a processor coupled to the first and second RF chain and a first, second, third and fourth subscriber identity/identification module (SIM), wherein the processor is configured with processor-executable instructions to perform operations comprising:
maintaining active in a first data traffic state on the first RF chain a first subscription associated with the first SIM, wherein the first data traffic state operates with tune away support;
maintaining active in a second data traffic state on the second RF chain a second subscription associated with the second SIM, wherein the second data traffic state operates with tune away support;
maintaining active in a slotted idle state each of a third subscription associated with the third SIM and a fourth subscription associated with the fourth SIM on the second RF chain of the mobile device, wherein in the slotted idle state the third subscription and the fourth subscription are able to monitor pages in respective ones of paging channel slots; and
switching the third subscription and the fourth subscription to the first RF chain in response to a first throughput data rate of the first subscription being lower than a second throughput data rate of the second subscription.

27. The mobile device of claim 26, wherein the processor is configured with processor-executable instructions to perform operations further comprising:
maintaining active on the first RF chain the third subscription and the fourth subscription in the slotted idle state and the first subscription in the first data traffic state with tune away support.

28. The mobile device of claim 26, wherein the processor is configured with processor-executable instructions to perform operations further comprising:
determining at least one of the first throughput data rate and the second throughput data rate.

29. The mobile device of claim 26, wherein the processor is configured with processor-executable instructions to perform operations further comprising:
switching at least one of the third subscription and the fourth subscription to the second RF chain in response to the second subscription exiting the second data traffic state.

30. The mobile device of claim 26, wherein the processor is configured with processor-executable instructions to perform operations further comprising:
switching the third subscription and the fourth subscription to the second RF chain in response to at least one of the first throughput data rate and the second throughput data rate changing, whereby the first throughput data rate exceeds the second throughput data rate.

31. A mobile device, comprising:
a first radio frequency (RF) chain;
a second RF chain;
means for maintaining active in a first data traffic state on the first RF chain a first subscription associated with a first subscriber identity/identification module (SIM), wherein the first data traffic state operates with tune away support;
means for maintaining active in a second data traffic state on the second RF chain a second subscription associated with a second SIM, wherein the second data traffic state operates with tune away support;
means for maintaining active in a slotted idle state each of a third subscription associated with a third SIM and a fourth subscription associated with a fourth SIM on the second RF chain of the mobile device, wherein in the slotted idle state the third subscription and the fourth subscription are able to monitor pages in respective ones of paging channel slots; and
means for switching the third subscription and the fourth subscription to the first RF chain in response to a first throughput data rate of the first subscription being lower than a second throughput data rate of the second subscription.

32. The mobile device of claim 31, further comprising:
means for maintaining active on the first RF chain the third subscription and the fourth subscription in the slotted idle state and the first subscription in the first data traffic state with tune away support.

33. The mobile device of claim 31, further comprising:
means for determining at least one of the first throughput data rate and the second throughput data rate.

34. The mobile device of claim 31, further comprising:
means for switching at least one of the third subscription and the fourth subscription to the second RF chain in response to the second subscription exiting the second data traffic state.

35. The mobile device of claim 31, further comprising:
means for switching the third subscription and the fourth subscription to the second RF chain in response to at least one of the first throughput data rate and the second throughput data rate changing, whereby the first throughput data rate exceeds the second throughput data rate.

36. A non-transitory processor-readable medium having stored thereon processor-executable instructions configured to cause a processor of a mobile device to perform operations comprising:
maintaining active in a first data traffic state on a first radio frequency (RF) chain of the mobile device a first subscription associated with a first subscriber identity/identification module (SIM), wherein the first data traffic state operates with tune away support;
maintaining active in a second data traffic state on a second RF chain of the mobile device a second subscription associated with a second SIM, wherein the second data traffic state operates with tune away support;
maintaining active in a slotted idle state each of a third subscription associated with a third SIM and a fourth subscription associated with a fourth SIM on the second RF chain of the mobile device, wherein in the slotted idle state the third subscription and the fourth subscription are able to monitor pages in respective ones of paging channel slots; and
switching the third subscription and the fourth subscription to the first RF chain in response to a first throughput data rate of the first subscription being lower than a second throughput data rate of the second subscription.

37. The non-transitory processor-readable medium of claim 36, wherein the stored processor-executable instructions are configured to cause the processor of the mobile device to perform operations further comprising:
maintaining active on the first RF chain the third subscription and the fourth subscription in the slotted idle state and the first subscription in the first data traffic state with tune away support.

38. The non-transitory processor-readable medium of claim 36, wherein the stored processor-executable instructions are configured to cause the processor of the mobile device to perform operations further comprising:
determining at least one of the first throughput data rate and the second throughput data rate.

39. The non-transitory processor-readable medium of claim 36, wherein the stored processor-executable instructions are configured to cause the processor of the mobile device to perform operations further comprising:
switching at least one of the third subscription and the fourth subscription to the second RF chain in response to the second subscription exiting the second data traffic state.

40. The non-transitory processor-readable medium of claim 36, wherein the stored processor-executable instructions are configured to cause the processor of the mobile device to perform operations further comprising:
switching the third subscription and the fourth subscription to the second RF chain in response to at least one of the first throughput data rate and the second throughput data rate changing, whereby the first throughput data rate exceeds the second throughput data rate.

* * * * *